US012577827B2

(12) United States Patent
Glogovsky et al.

(10) Patent No.: US 12,577,827 B2
(45) Date of Patent: Mar. 17, 2026

(54) SAFE

(71) Applicant: SA Consumer Products, Inc., Leawood, KS (US)

(72) Inventors: Richard S. Glogovsky, Libertyville, IL (US); Ben Lavallee, McDonald, PA (US); Hu Chen Jie, Ningbo (CN); Hu Hui Xiang, Ningbo (CN)

(73) Assignee: SA Consumer Products, Inc., Rolling Meadows, IL (US)

( * ) Notice: Subject to any disclaimer, the term of this patent is extended or adjusted under 35 U.S.C. 154(b) by 331 days.

(21) Appl. No.: 17/406,866

(22) Filed: Aug. 19, 2021

(65) Prior Publication Data

US 2023/0056375 A1 Feb. 23, 2023

(51) Int. Cl.
*E05G 1/026* (2006.01)
*E05B 65/00* (2006.01)
*E05G 1/00* (2006.01)

(52) U.S. Cl.
CPC .......... *E05G 1/026* (2013.01); *E05B 65/0075* (2013.01); *E05G 1/005* (2013.01)

(58) Field of Classification Search
CPC ........... E05G 1/00; E05G 1/005; E05G 1/026; E05G 1/04; E05B 65/0075; A47B 88/60
See application file for complete search history.

(56) References Cited

U.S. PATENT DOCUMENTS 3,433,185 A 3/1969 Roberts
3,444,830 A 5/1969 Doetsch
4,941,718 A * 7/1990 Alexander, III .......... E05G 1/00 296/37.7
5,056,342 A * 10/1991 Prinz .......................... E05G 1/00 109/51
5,329,865 A 7/1994 McWard
5,407,261 A * 4/1995 Mercer ................ A47B 46/005 312/248
5,487,525 A 1/1996 Drabezyk et al.
(Continued)

FOREIGN PATENT DOCUMENTS

CH 483230 A 12/1969

OTHER PUBLICATIONS

Evoletn.com, 2 Pack Lift Up Top Coffee Table Mechanism Spring Hinge Hardware Fitting Table Hinge for Furniture Accessories, Multi-functional Pneumatic Gas Spring Lift Support for Coffee Table, SKIL#PA742510.

(Continued)

*Primary Examiner* — Christopher J Boswell
(74) *Attorney, Agent, or Firm* — AVEK IP, LLC; Mark C. Young

(57) ABSTRACT

An under counter safe for securing items and providing quick access includes upper and lower sections forming an interior cavity, with the upper section attachable to the underside of a countertop, desk, or other surface. A linkage mechanism may connect the upper and lower sections, allowing the lower section to be raised or lowered with respect to the upper section to allow access to the interior cavity. A dual locking mechanism may secure the lower section to the upper mechanism at two points, and a release mechanism may simultaneously disengage both locking points to allow access. The release mechanism may be manually or electronically activated.

9 Claims, 10 Drawing Sheets

(56) References Cited

U.S. PATENT DOCUMENTS

| | | | | |
|---|---|---|---|---|
| 5,695,038 | A | 12/1997 | Keith, III et al. | |
| 6,843,081 | B1 * | 1/2005 | Painter | F41C 33/06 42/70.11 |
| 8,356,730 | B2 | 1/2013 | Vysma et al. | |
| 8,726,704 | B2 | 5/2014 | White | |
| 9,016,811 | B2 * | 4/2015 | Raunikar | A47B 88/473 312/249.7 |
| 9,021,840 | B2 * | 5/2015 | Andrews | E05G 1/00 109/59 R |
| 9,113,703 | B2 | 8/2015 | Flaherty | |
| 9,530,266 | B2 | 12/2016 | Delattre et al. | |
| 9,980,564 | B2 | 5/2018 | Roberts et al. | |
| 10,253,529 | B1 | 4/2019 | McGinn | |
| 10,285,496 | B2 | 5/2019 | Hu | |
| 11,028,636 | B2 | 6/2021 | Delattre et al. | |
| 11,666,148 | B2 * | 6/2023 | Steere | A47B 81/005 211/13.1 |
| 2014/0191640 | A1 | 7/2014 | Marsters et al. | |
| 2022/0343706 | A1 | 10/2022 | So | |

OTHER PUBLICATIONS

Amazon.com, Under Cabinet Knife Block.
Home Depot, Aux Keypad Vault Drop Down Gun Safe, Internet #301613116, Model #75431, by SnapSafe.
Humansolution, Locking Under Desk Drawer with Shelf by UPLIFT Desk.

* cited by examiner

SAFE

BACKGROUND

Consumers and business owners rely on safes and strong boxes to secure valuable possessions such as money, jewelry, and important documents. The level of protection provided by such devices varies greatly, with some offering fire resistance, hardened cases, and the like to provide specific levels of protection as desired by the user of the safe. One commonality with such protective devices is that they are typically intended to be hidden and infrequently accessed, as displaying the safe may simply alert others that valuables are contained inside. Thus, most consumer safes, such as those used in homes and businesses are often located in a hidden or remote location of the premises and are often bolted in place in that location to deter theft of the safe itself.

While generally useful, such known devices are not conducive to frequent or convenient access, thus, users tend to delay access to their safes. For example, a retail business owner may collect cash from transactions throughout the day but only access his or her safe at the end of the day to store the day's receipts. Similarly, a remotely located or hidden safe is not ideal for storing a firearm intended to be quickly accessed for protection.

Thus, it can be seen that there remains a need in the art for a safe that can be hidden from direct view yet still provides quick and convenient access to the safe's contents.

SUMMARY

Embodiments of the invention are defined by the claims below, not this summary. A high-level overview of various aspects of the invention is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes an under counter safe with a dual lock mechanism activated by single release. Thus, the safe may be mounted under a desk, countertop, or other surface to remain hidden, while the contents may be easily accessed by separating a lower tray from an upper portion mounted to the surface.

In one aspect, the under counter safe of the present invention comprises a storage container for securing items, documents, and the like. The storage container is configured to be mounted to the underside of a counter, desktop, or other similar support surface for access by a user. In the case of a desktop or under counter installation (e.g., such as a countertop at a checkout lane of a store), the safe is generally hidden from direct view by those on the outside or opposite side of the desk or counter from the user who has access to the safe. The storage container is formed of separable upper and lower sections, with linkage mechanisms at each side of the container connecting the two sections to allow the lower section to be pivoted away from the upper section to allow access to the interior of the container. The linkage mechanisms thus keep the two sections attached to each other while allowing the lower section to be moved apart from, or back toward, the upper section. With the upper section attached to the lower surface of a desktop or counter via a mounting plate, the storage container can be opened by pulling down on the lower section to move it away from the upper section, revealing the interior of the container, and can be closed by pushing the lower section upwardly to join the upper section.

In one embodiment, the linkage mechanisms each comprise a pair of elongated support arms positioned generally parallel to each other and extending between the upper and lower sections, with each end of each support arm pivotably attached to the corresponding upper or lower section. When the lower section is pulled downwardly from the upper sections, the support arms rotate/pivot to extend generally vertically between the separated sections. When the lower section is pushed upwardly against the upper section, the support arms rotate/pivot to a generally horizontal orientation, with the support arms concealed inside of the storage container.

In one embodiment one or more gas springs, gas struts, or other soft-close dampers or mechanisms limit the rate of travel of the lower section away from the upper section to smooth the movement of the lower section. Similarly, the gas spring slightly opposes the upward movement of the lower section to provide smooth upward movement and to prevent the lower section from being slammed closed against the stationary upper section.

A dual lock mechanism comprised of front and rear hooks and latches may be controlled by a single-release mechanism which simultaneously activates both latches. The separate front and rear latches provide increased security by securing two points on the container, while the single release mechanism allows a user to unlock and open the container quickly and easily. In one embodiment, the dual lock mechanism is actuated by a biometric sensor actuation device, in alternative embodiments the dual lock mechanism is actuated manually via a pushbutton or key lock, in further embodiments the dual lock mechanism may be manually or biometrically actuated.

BRIEF DESCRIPTION OF THE DRAWINGS

Illustrative embodiments of the invention are described in detail below with reference to the attached drawing figures, and wherein.

DETAILED DESCRIPTION

Figure 1:
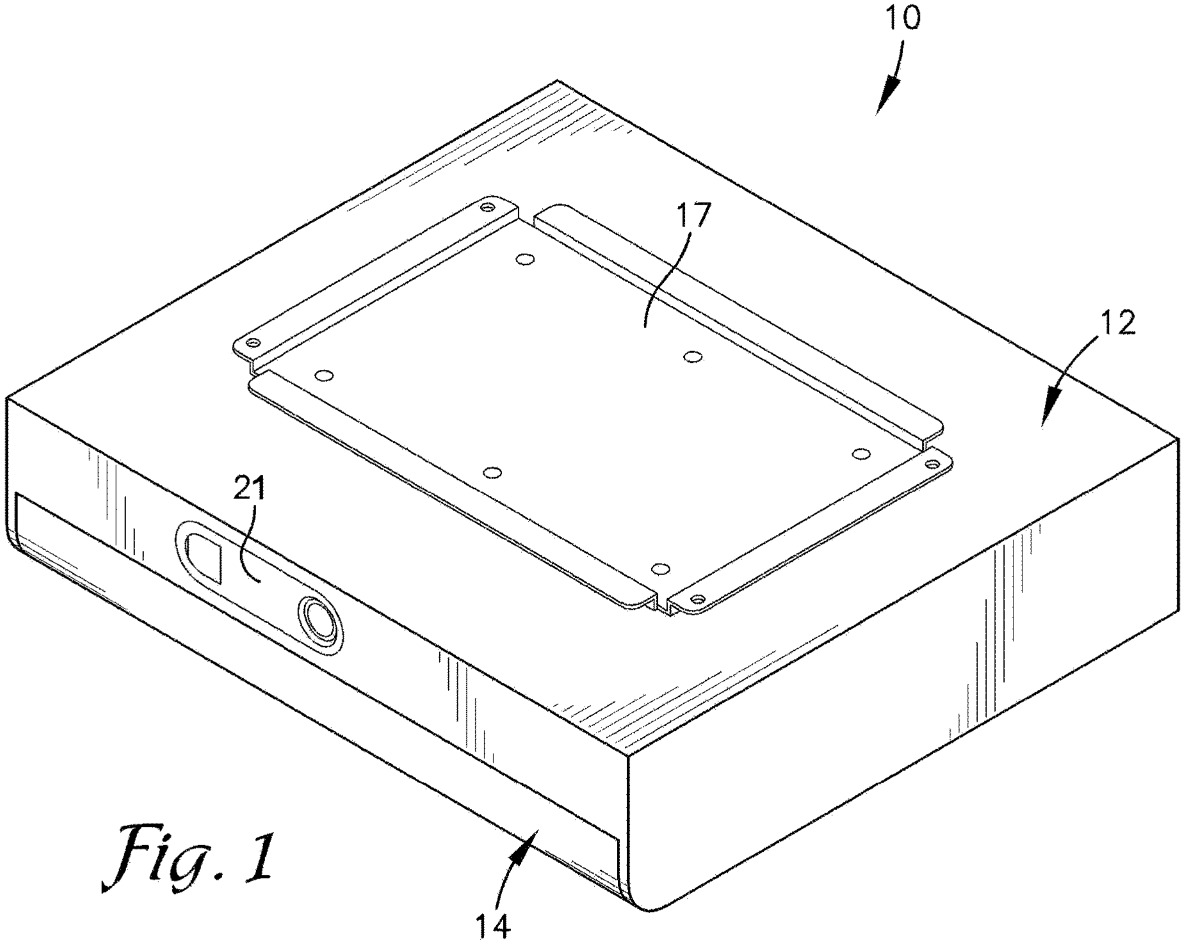
FIG. 1 is a perspective view of an under counter safe in accordance with an exemplary embodiment of the present invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology may be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Such terminology includes the words specifically mentioned, derivatives thereof and words of a similar import.

Figure 2:
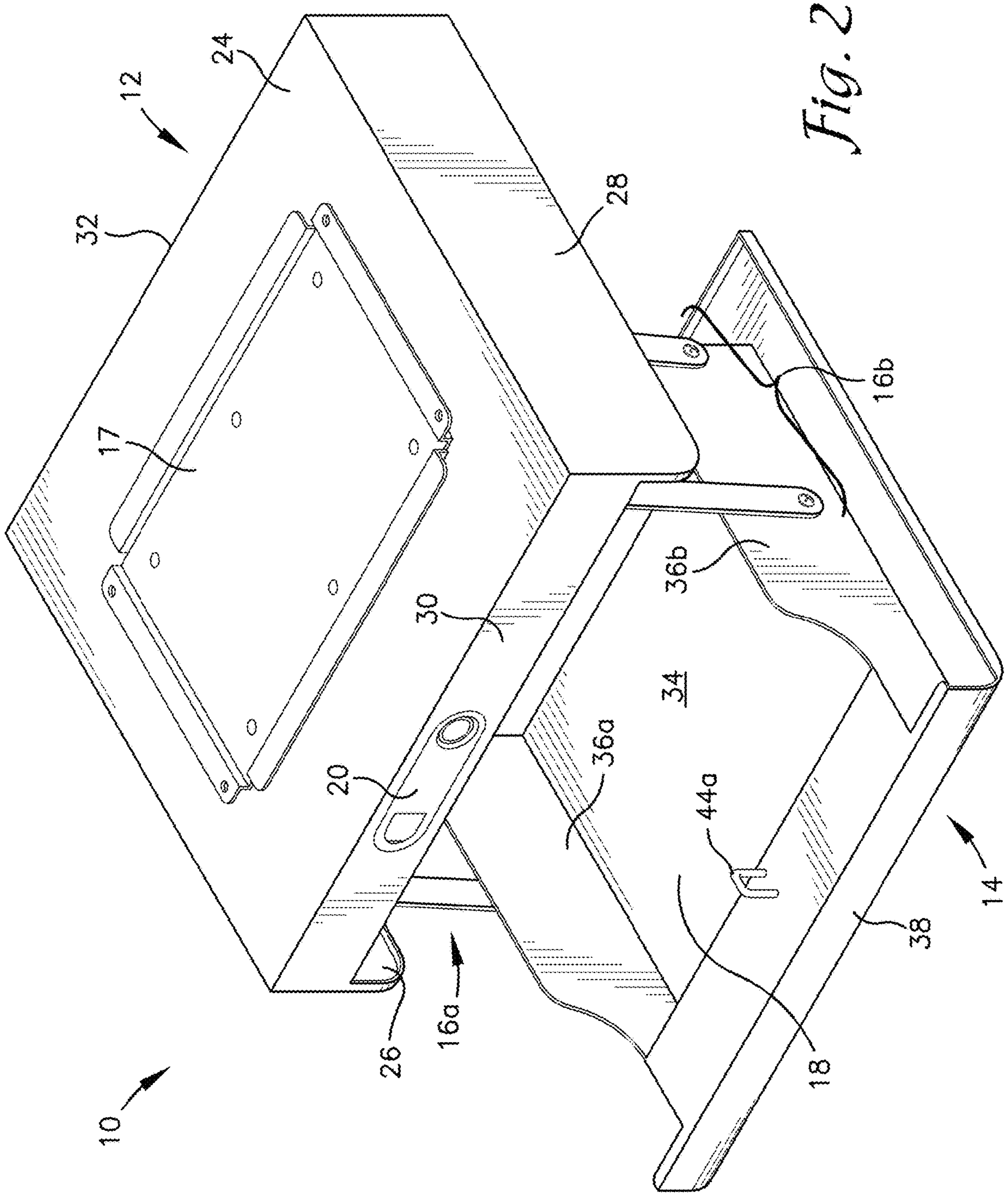
FIG. 2 is a perspective view of the under counter safe of FIG. 1 with the upper and lower sections separated.

Looking first to FIGS. 1 and 2, an under counter safe in accordance with an exemplary embodiment of the present invention is depicted generally by the numeral 10. The under counter safe 10 comprises a generally rectangular shaped upper section 12 and a generally rectangular shaped lower section 14 attached to each other via left and right linkage mechanisms 16*a*, 16*b* to form an interior cavity 18 between the two for storing valuables. As will be described in more detail hereinbelow, a dual locking mechanism secures the upper 12 and lower 14 sections together when the two are positioned as depicted in FIG. 1, thus securing the interior cavity and its contents. The dual locking mechanism can be actuated by a release mechanism 20 that allows the upper 12 and lower 14 sections to be separated by moving the lower section 14 downward and away from the upper section 12 as depicted in FIG. 2, allowing access to the interior cavity 18 and its contents. Release mechanism 20 may be activated by a front mounted unlocking apparatus 21.

Figure 3:
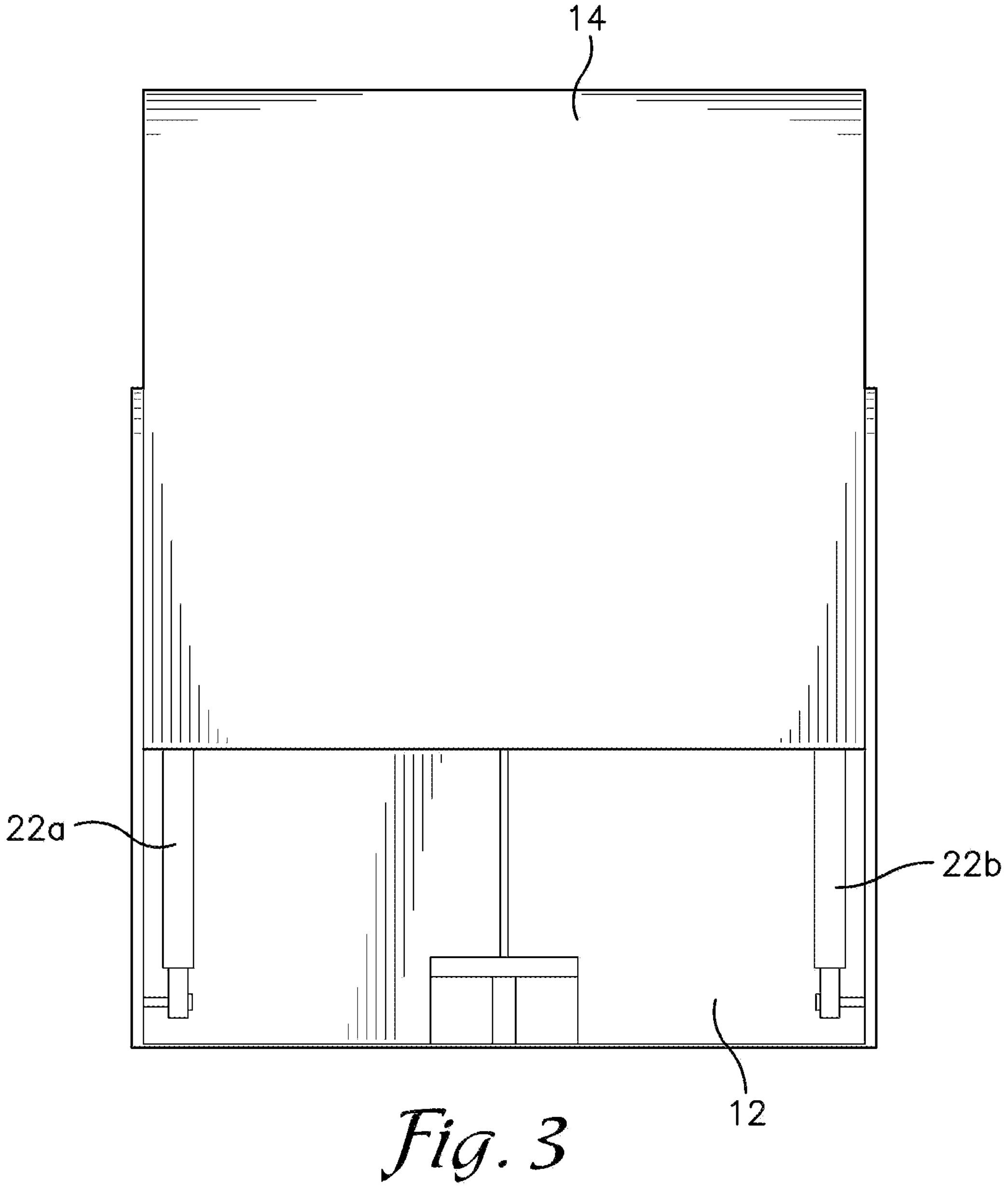
FIG. 3 is a bottom plan view of the under counter safe of FIG. 2.

As seen in FIG. 3 an underside view of the safe of FIGS. 1 and 2, left 22*a* and right 22*b* dampers limit the rate of travel of the lower section 14 as it is moved toward or away from the upper section 12 so that the lower section 14 travels in a smooth, fluid motion as it is lowered or raised.

Upper and lower sections 12, 14 are preferably formed from a strong, rigid material such as steel, but may alternatively be comprised of other materials such as wood, composite, or other lighter weight material. Upper section 12 comprises a top panel 24, left and right side panels 26, 28, and front 30 and rear 32 panels joined to form a generally rectangular shaped inverted box. The front panel 30 extends downwardly approximately half the distance that the left and right panels 26, 28 extend. Lower section 14 comprises a bottom panel 34 with left and right interior side panels 36*a*, 36*b* extending upwardly from the bottom panel 34, with the left and right interior side panels 36*a*, 36*b* positioned inwardly from the left and right edges of the lower panel 34. A front lip 38 extends upwardly from the bottom panel 34 approximately half the distance that the left and right interior side panels 36*a*, 36*b* extend.

Thus configured, when closed (i.e., with the lower section 14 moved upwardly to adjoin and lock to the upper section 12) the upwardly extending front lip 38 of the lower section 14 meets and adjoins the downwardly extending front panel 30 of the upper section 12. And, when closed, the left and right interior side panels 36*a*, 36*b* of the lower section 12 extend upwardly into the interior portion of the upper section so that they are contained inside the safe.

A mounting plate 17 attached to the top panel 24 of the upper section 12 allows the under counter safe 10 to be attached to the underside of a counter top, desk, or other like surface, with apertures in the plate 17 for mounting using screws, bolts, or other hardware.

Figure 4:
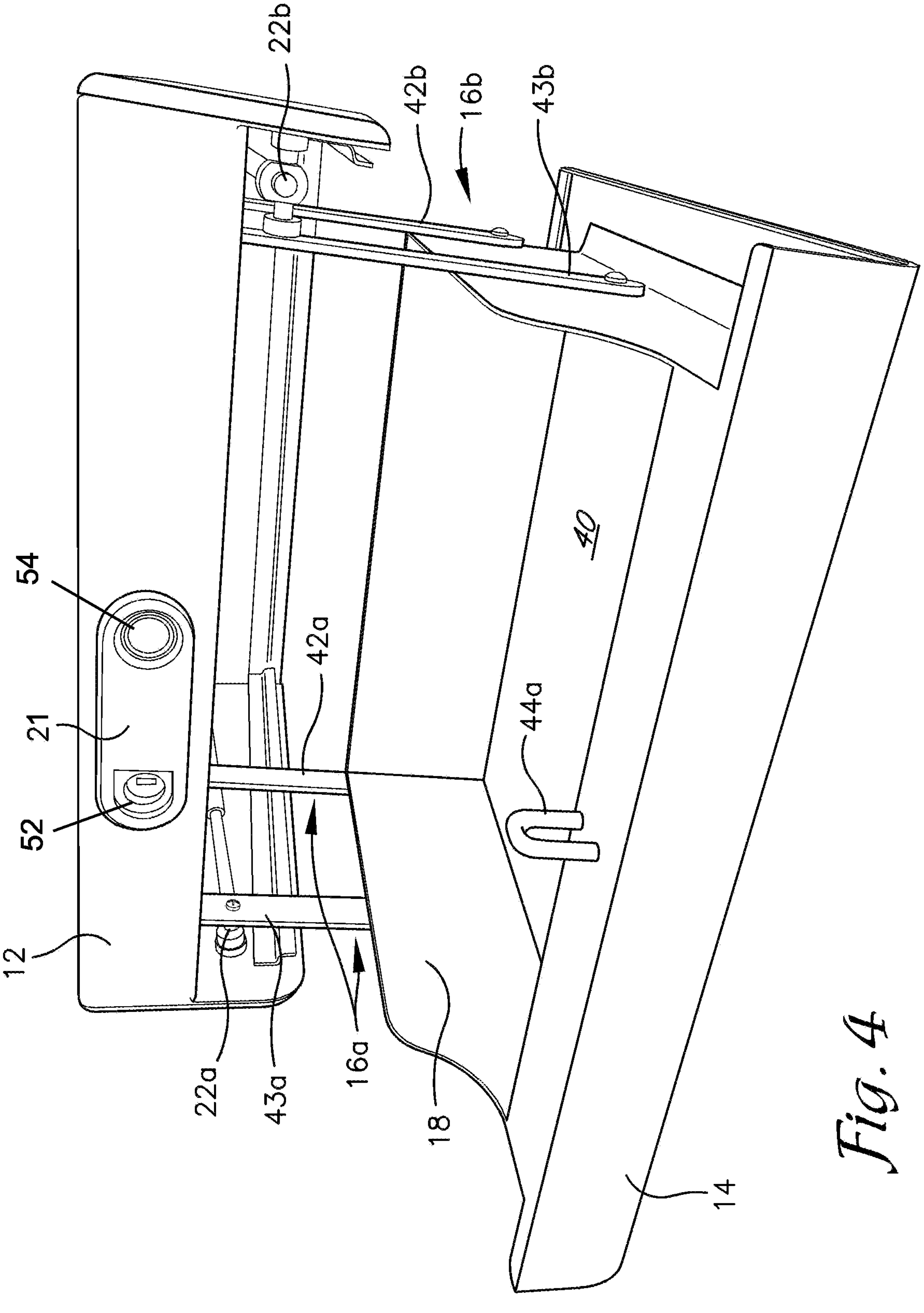
FIG. 4 is a front perspective view of the under counter safe of FIG. 2.
Figure 5:
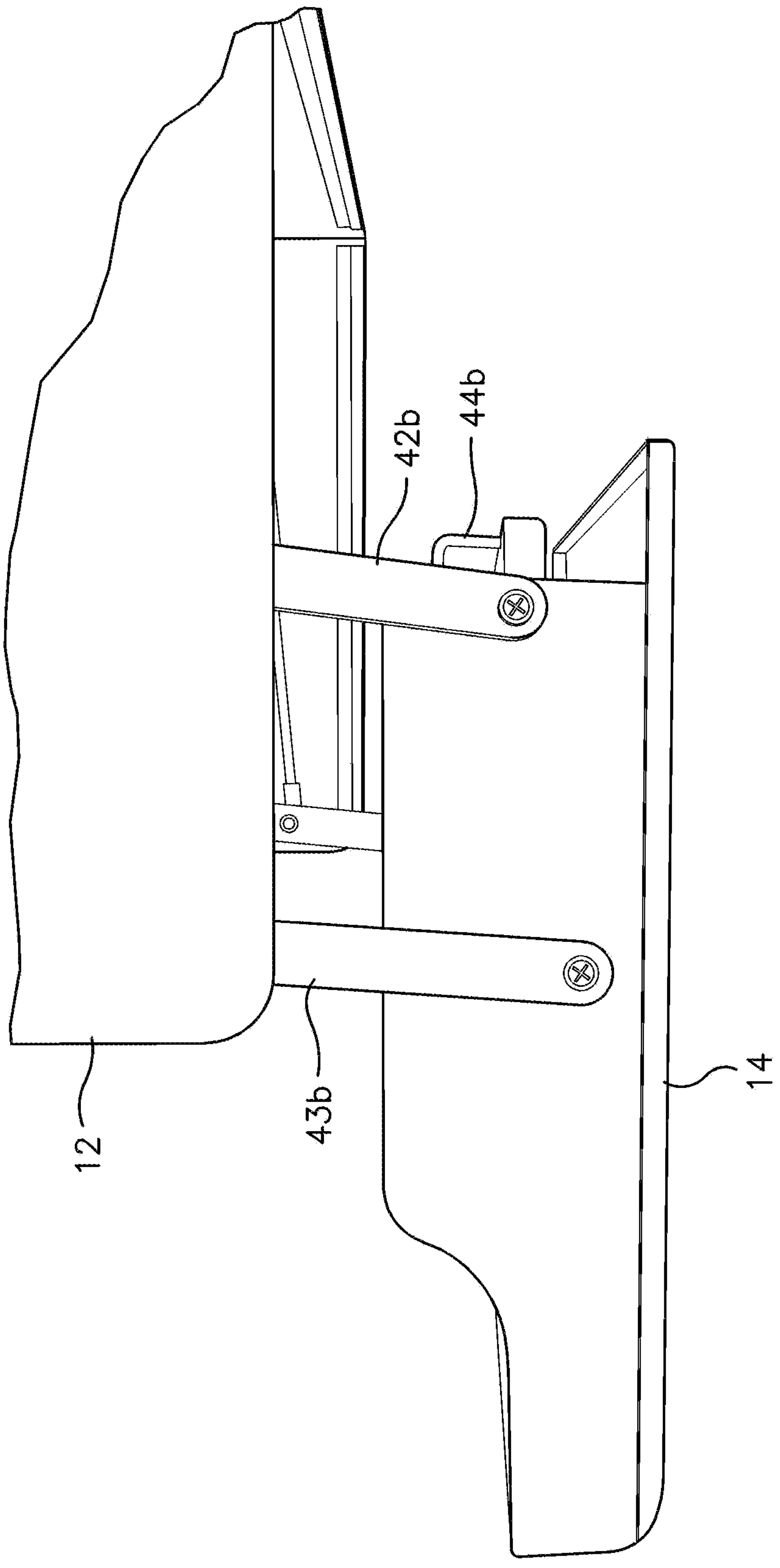
FIG. 5 is a side view of the under counter safe of FIG. 2.
Figure 6:
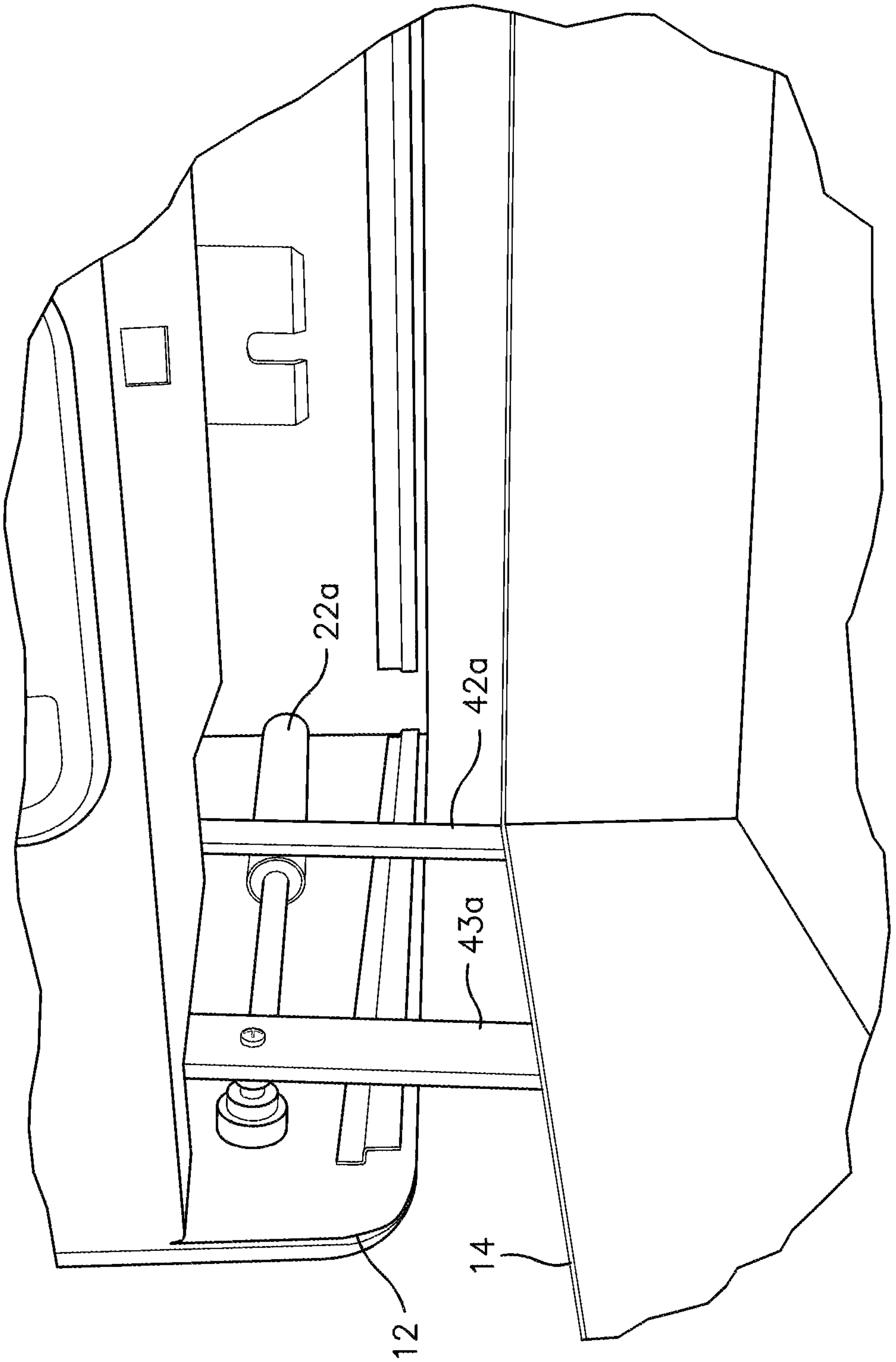
FIG. 6 is an upward-looking perspective view of an interior portion of the under counter safe of FIG. 2.

Turning to FIG. 4, a front view of the under counter safe 10 shows the interior cavity 18, with a padded mat 40 placed on the bottom panel 34 of the lower section 14 to protect items placed into the safe. As can be seen in the figure, left and right linkage mechanisms 16*a*, 16*b* each comprise a pair of elongated support arms (left 42*a*, 43*a*; right 42*b*, 43*b*) extending between the upper and lower sections. Each end of each control arm may be pivotably attached to the corresponding upper and lower section to allow the lower section 14 to be moved upwardly, toward the upper section 12, and downwardly, away from the upper section 12 whereby the control arms pivot to control the movement of the lower section. Thus, as seen in FIG. 4, with the lower section 14 moved downwardly, the control arms 42*a*, 42*b*, 43*a*, 43*b* extend generally vertically to support the lower section 14 in position. Raising the lower section 14 upwardly toward the upper section 12 pivots the lower end of the control arms upwardly such that the control arms are generally horizontal when the lower section is stowed and locked against the upper section. As shown in FIGS. 2 and 4, when the lower section 14 is dropped down, the pivoting action of the control arms may move the lower section slightly forward, i.e., the lower section swings down and outward toward a user, thus allowing easier access to the interior cavity 18 and the items stored therein.

As can also be seen in FIG. 4, the left and right dampers 22*a*, 22*b* may attach to the upper pivot point of the forwardmost control arm of each of the left and right linkage mechanisms, with the opposite ends of the dampers attached to the body of the upper section 12 to control the rate at which the lower section 14 can be moved up or down as previously described.

Figure 7:
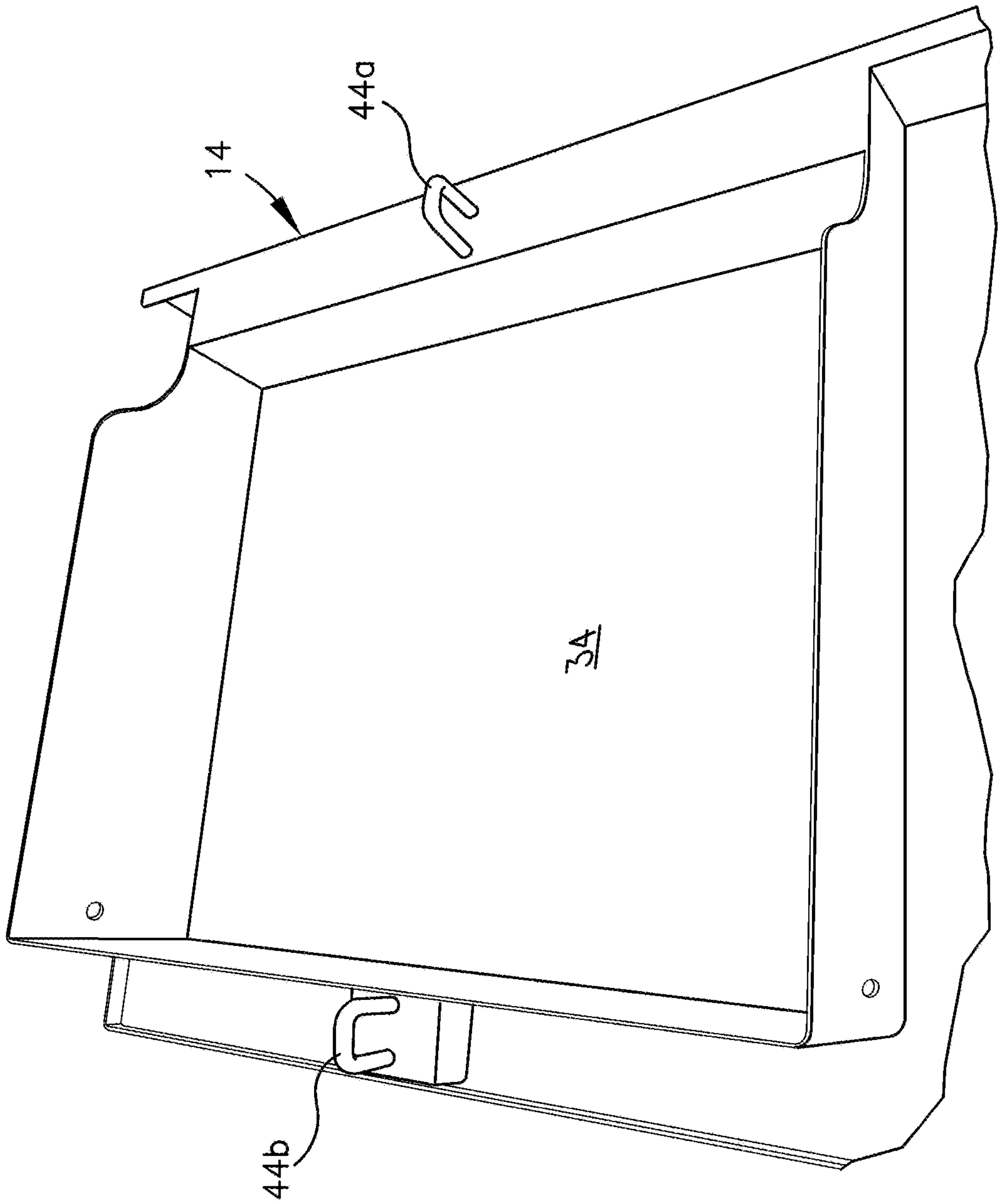
FIG. 7 is a perspective view of the bottom section of the under counter safe of FIG. 2 detached from the upper section.

Looking to FIG. 7 in conjunction with FIG. 4, front and rear latches 44*a*, 44*b*, extend upwardly from the center front and rear edges of the lower section 14. The front and rear latches may be U-shaped cylindrical bolts attached securely to the lower section 14 by welding or other permanent connection. Each of the front and rear latches 44*a*, 44*b* may be configured to mate with a corresponding hook on the release mechanism (described below) mounted to the upper section 12 to secure the lower section 14 to the upper section 12 and likewise secure the items contained in the inner cavity 18.

FIGS. 5 through 8 provide further views of the linkage mechanisms 16*a*, 16*b*, dampers 22*a*, 22*b*, and the attachment and arrangement of the components within the upper and lower sections 12, 14 as just described.

Figure 8:
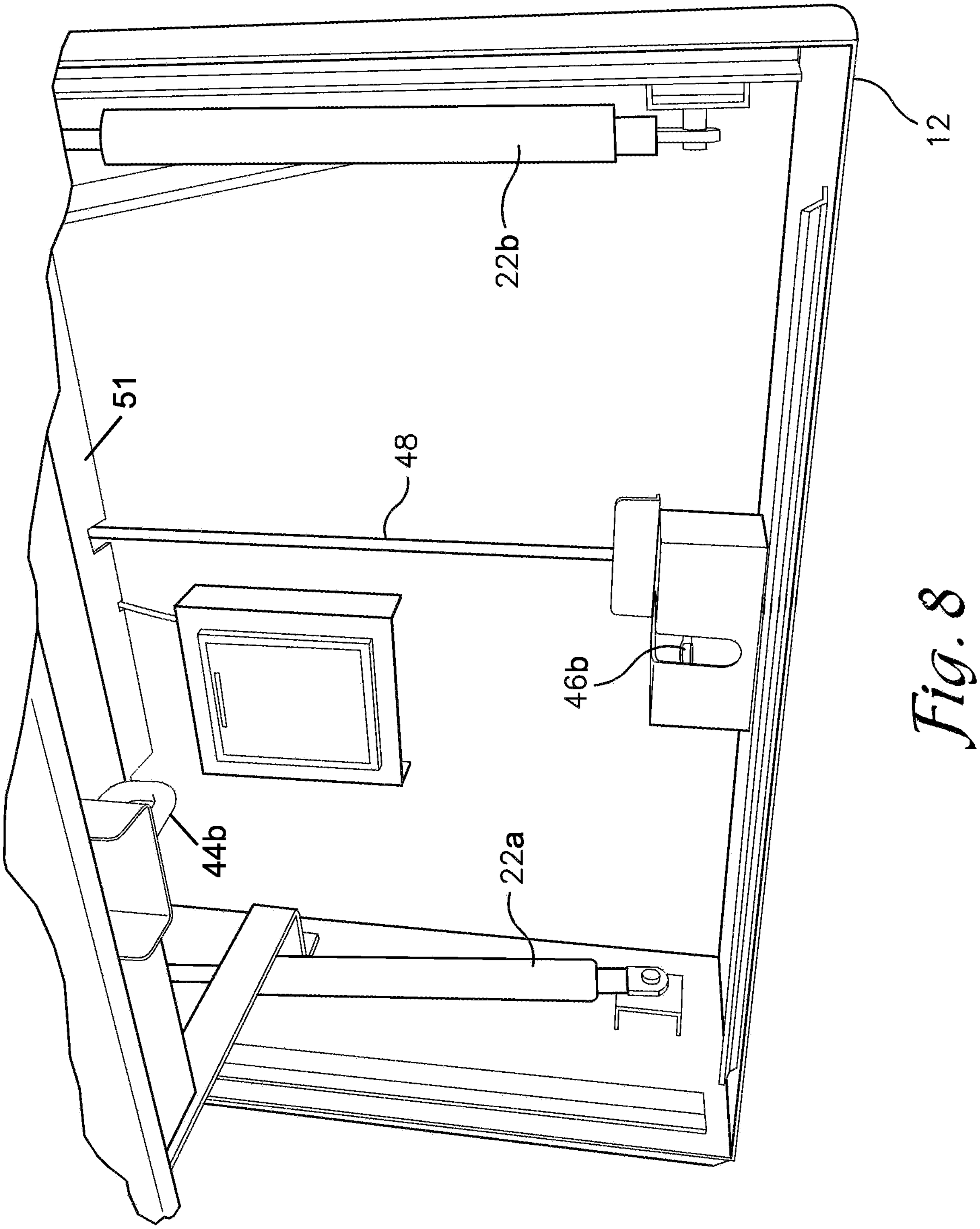
FIG. 8 is an upward-looking view of the interior side of the upper section of the under counter safe of FIG. 2.
Figure 9:
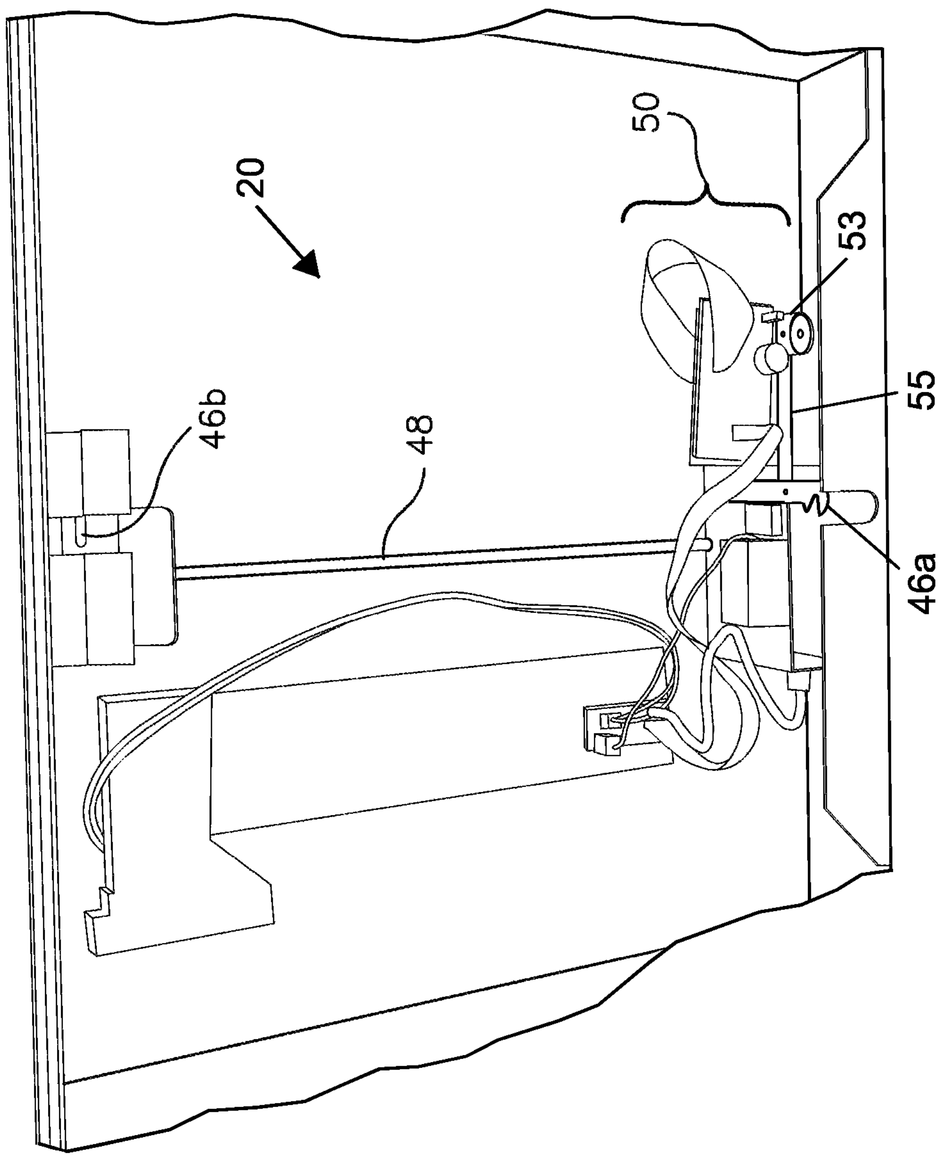
FIG. 9 is a partial view of an alternate embodiment of the interior side of the upper section of the under counter safe of FIG. 2 showing the dual lock mechanism and release mechanism.

Looking to FIGS. 8 and 9, the release mechanism 20 comprises a front hook 46*a* and rear hook 46*b* attached to opposite ends of a connecting rod 48 which extends into an actuating mechanism 50 attached to the front side of the upper section 12. Each of the front and rear hooks is configured to engage with the corresponding latches 44*a*, 44*b* as previously described to secure the lower section 14 to the upper section 12. Movement of the connecting rod 48 simultaneously pivots the front and rear hooks 46*a*, 46*b* to engage with the latches 44*a*, 44*b* (to lock and secure the lower section to the upper section) or to disengage from the latches (to allow the lower section to be moved downwardly, i.e., to open the safe). The connecting rod 48 may move back and forth along its longitudinal axis, side to side in a direction transverse to the longitudinal axis, or it could rotate around the longitudinal axis in order to pivot the front and rear hooks 46*a* and 46*b*. In the exemplary embodiment shown in the figures, the connecting rod 48 rotates around its axis to pivot the front and rear hooks.

Looking to FIGS. 8 and 9, the release mechanism 20 includes an actuating mechanism 50 configured to engage with the connecting rod 48 and rotate the rod 40 to simultaneously engage or disengage the hooks 46*a*, 46*b* with/from the latches 44*a*, 44*b*.

The actuating mechanism 50 may be a manual mechanism, such as a key lock actuator or push button which causes the connecting rod 48 to move. In one embodiment, the actuating mechanism includes a biometric device, such as a fingerprint scanner, that activates a solenoid to move the connecting rod. Other types of electronic actuation devices may also be used, or combinations of electronic, biometric, or manual actuation devices may be included. As seen in FIG. 9, the actuating mechanism 50 includes electronic circuitry comprising a biometric fingerprint reader operable to move/actuate the connecting rod to disengage the hooks from the latches to unlock the safe. As shown in FIG. 8, actuating mechanism 50 may include a cover 51.

Figure 10:
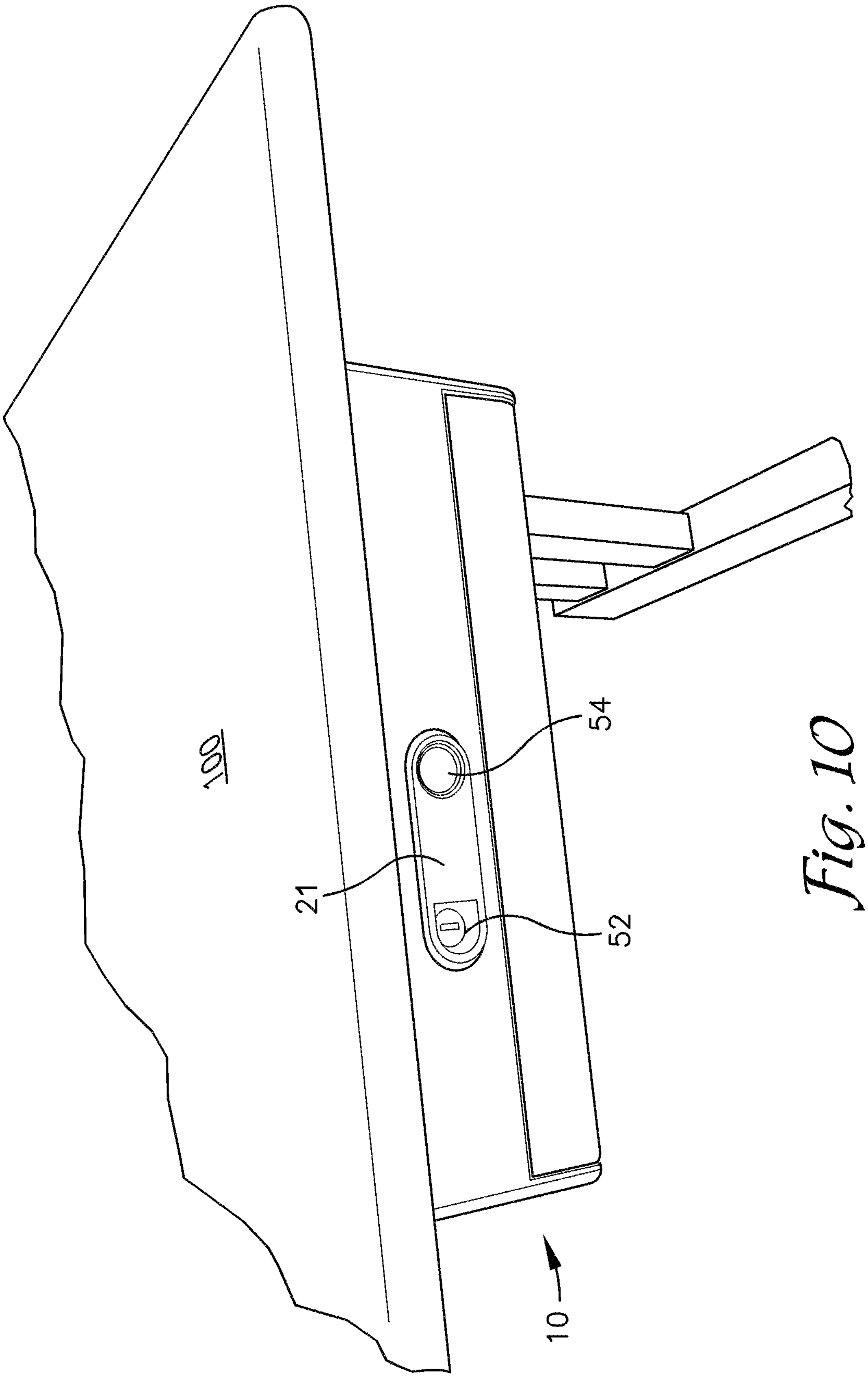
FIG. 10 is an environmental perspective view of the under counter safe of FIG. 1 shown installed to the underside of a counter.

Looking to FIG. 10, a safe in accordance with an exemplary embodiment of the present invention is attached to the underside of a countertop 100, with an unlocking apparatus 21 accessible on the front panel of the safe to allow a user to lock or unlock the safe via a keylock 52 or biometric fingerprint 54 actuating mechanism. The keylock 52 may serve as a mechanical backup or override should an electrical component of the actuating mechanism 50 fail or malfunction. A user may insert a key (not shown) into keylock 52, and when the key is turned it may rotate a cam 53 that moves a linkage 55 attached to release mechanism 20. Linkage 55 may be attached to release mechanism 20 in various ways including connecting to front hook 46*a*. When cam 53 moves linkage 55, the linkage in turn rotates the front hook 46*a* (or whatever part of the release mechanism 20 the linkage is connected to) thereby rotating front hook 46*a*, connecting rod 48, and rear hook 46*b* to disengage the hooks from the latches to unlock the safe. By using a keylock 52 in this fashion, safe 10 may be unlocked and opened even if the electrical components of release mechanism 20 are not functioning. An additional feature of the keylock 52 may be that the key is allowed to rotate slightly before the release mechanism 20 is released. This feature can be employed in a number of ways such as forming a slot in the linkage 55 that does not engage with the cam 53 until the key has turned a certain amount (e.g., 15-20 degrees). This helps ensure that safe 10 is not inadvertently unlocked by keylock 52.

It should be understood that regardless of the actuating mechanism employed, the lower section 14 is locked and secured to the upper section 12 at two points of contact (the front and rear latches and hooks) and that the release mechanism 20 simultaneously actuates both the front and rear hooks to unlock the safe and allow the bottom section to be lowered, allowing access to the inner cavity.

Thus, it can be seen that the under counter safe of the present invention is well suited to provide secure containment of valuables while also providing quick and easy access to those items using the dual release mechanism.

As used herein, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

Having thus described the invention, what is claimed as new and desired to be secured by Letters Patent is:

1. An under counter safe comprising:

an upper section having a front, back, left, and right sides defining a generally rectangular shaped inverted box, and a front portion and a back portion, wherein the front portion comprises a front panel and the back portion comprises a rear panel;

a lower section movably attached to the upper section by left and right linkage mechanisms attached proximate the left and right sides, respectively, of the upper section;

a locking mechanism comprising first and second hooks configured to secure the lower section to the upper section, the first hook located proximate the front panel and the second hook located proximate the rear panel; and a release mechanism configured to actuate the first and second hooks simultaneously.

2. The under counter safe of claim 1 further comprising a damper in communication with at least one of the left and right linkage mechanisms, wherein the damper slows the movement of the lower section as the lower section moves away from the upper section.

3. The under counter safe of claim 1, wherein the release mechanism comprises a biometric sensor located on the front panel.

4. The under counter safe of claim 1, wherein the release mechanism further comprises a connecting rod extending between the front panel and the back panel.

5. The under counter safe of claim 1, wherein the release mechanism comprises an electronic actuating device.

6. An under counter safe comprising:

an upper section having a front, back, left, and right sides and a front portion and a back portion, wherein the front portion comprises a front panel and the back portion comprises a rear panel;

a lower section movably attached to the upper section by a linkage mechanism attached proximate the left or right side of the upper section;

a locking mechanism comprising first and second hooks configured to secure the lower section to the upper section, the first hook located proximate the front panel and the second hook located proximate the rear panel; and a release mechanism configured to actuate the first and second hooks simultaneously.

7. The under counter safe of claim 6 further comprising a damper attached to the linkage mechanism, wherein the damper slows the movement of the lower section as the lower section moves away from the upper section.

8. The under counter safe of claim 6 further comprising first and second latches, wherein the first latch is adapted to engage the first hook and the second latch is adapted to engage the second hook.

9. The under counter safe of claim 8, wherein the release mechanism comprises an electronic actuating device.

* * * * *